United States Patent
Wagner et al.

(10) Patent No.: US 9,135,514 B2
(45) Date of Patent: Sep. 15, 2015

(54) REAL TIME TRACKING/DETECTION OF MULTIPLE TARGETS

(75) Inventors: Daniel Wagner, Vienna (AT); Dieter Schmalstieg, Graz (AT)

(73) Assignee: QUALCOMM Incorporated, San Diego, CA (US)

( * ) Notice: Subject to any disclaimer, the term of this patent is extended or adjusted under 35 U.S.C. 154(b) by 346 days.

(21) Appl. No.: 13/112,890

(22) Filed: May 20, 2011

(65) Prior Publication Data

US 2011/0286631 A1     Nov. 24, 2011

Related U.S. Application Data

(60) Provisional application No. 61/347,015, filed on May 21, 2010.

(51) Int. Cl.
*G06K 9/00* (2006.01)
*G06K 9/32* (2006.01)

(52) U.S. Cl.
CPC .............. *G06K 9/32* (2013.01); *G06K 9/00993* (2013.01); *G06T 2207/10016* (2013.01)

(58) Field of Classification Search
USPC .......................................... 382/103; 348/169
See application file for complete search history.

(56) References Cited

U.S. PATENT DOCUMENTS

| | | | |
|---|---|---|---|
| 5,280,530 A * | 1/1994 | Trew et al. .................... | 382/103 |
| 5,969,755 A * | 10/1999 | Courtney ....................... | 348/143 |
| 6,275,236 B1 * | 8/2001 | Delahunty ....................... | 345/30 |
| 6,674,925 B1 * | 1/2004 | Schoepflin et al. ........... | 382/308 |
| 6,724,915 B1 * | 4/2004 | Toklu et al. .................... | 382/103 |
| 6,795,567 B1 * | 9/2004 | Cham et al. .................... | 382/103 |
| 7,095,786 B1 * | 8/2006 | Schonfeld et al. ........ | 375/240.16 |
| 7,133,537 B1 * | 11/2006 | Reid ............................. | 382/103 |
| 7,227,893 B1 * | 6/2007 | Srinivasa et al. ......... | 375/240.08 |
| 7,706,575 B2 * | 4/2010 | Liu et al. ........................ | 382/118 |
| 2004/0091158 A1 * | 5/2004 | Miled et al. .................... | 382/236 |
| 2004/0125984 A1 * | 7/2004 | Ito et al. ........................ | 382/103 |
| 2005/0018879 A1 * | 1/2005 | Ito et al. ........................ | 382/103 |
| 2005/0157169 A1 * | 7/2005 | Brodsky et al. ............... | 348/143 |
| 2005/0232466 A1 * | 10/2005 | Kampchen et al. ........... | 382/103 |
| 2006/0104487 A1 * | 5/2006 | Porter et al. .................. | 382/118 |
| 2006/0188131 A1 * | 8/2006 | Zhang et al. .................. | 382/103 |
| 2006/0268111 A1 * | 11/2006 | Zhang et al. .................. | 348/169 |

(Continued)

OTHER PUBLICATIONS

Wagner et al ("Multiple Target Detection and Tracking with Guaranteed Framerates on Mobile Phones", IEEE International Symposium on Mixed and Augmented Reality 2009).*

(Continued)

*Primary Examiner* — Shervin Nakhjavan
(74) *Attorney, Agent, or Firm* — Bala M. Ramasamy

(57) ABSTRACT

A mobile platform detects and tracks at least one target in real-time, by tracking at least one target, and creating an occlusion mask indicating an area in a current image to detect a new target. The mobile platform searches the area of the current image indicated by the occlusion mask to detect the new target. The use of a mask to instruct the detection system where to look for new targets increases the speed of the detection task. Additionally, to achieve real-time operation, the detection and tracking is performed in the limited time budget of the (inter) frame duration. Tracking targets is given higher priority than detecting new targets. After tracking is completed, detection is performed in the remaining time budget for the frame duration. Detection for one frame, thus, may be performed over multiple frames.

31 Claims, 4 Drawing Sheets

(56) References Cited

U.S. PATENT DOCUMENTS

| | | | |
|---|---|---|---|
| 2006/0291693 A1* | 12/2006 | Olson et al. | 382/103 |
| 2007/0104383 A1* | 5/2007 | Jojic et al. | 382/254 |
| 2007/0127774 A1* | 6/2007 | Zhang et al. | 382/103 |
| 2008/0123959 A1* | 5/2008 | Ratner et al. | 382/173 |
| 2008/0152213 A1* | 6/2008 | Medioni et al. | 382/154 |
| 2008/0205703 A1* | 8/2008 | Brown et al. | 382/103 |
| 2008/0240588 A1* | 10/2008 | Tsoupko-Sitnikov et al. | 382/236 |
| 2008/0270569 A1* | 10/2008 | McBride et al. | 709/217 |
| 2009/0060277 A1* | 3/2009 | Zhang et al. | 382/103 |
| 2009/0116732 A1* | 5/2009 | Zhou et al. | 382/154 |
| 2009/0169067 A1* | 7/2009 | Chang et al. | 382/118 |
| 2009/0202114 A1* | 8/2009 | Morin et al. | 382/118 |
| 2009/0245573 A1* | 10/2009 | Saptharishi et al. | 382/103 |
| 2009/0304229 A1* | 12/2009 | Hampapur et al. | 382/103 |
| 2010/0045799 A1* | 2/2010 | Lei et al. | 348/169 |
| 2010/0045800 A1* | 2/2010 | Chebil et al. | 348/169 |

OTHER PUBLICATIONS

Wagner et al ("Multiple Target Detection and Tracking with Guaranteed Framerates on Mobile Phones", IEEE, Oct. 2009.*

* cited by examiner

REAL TIME TRACKING/DETECTION OF MULTIPLE TARGETS

CROSS-REFERENCE TO PENDING PROVISIONAL APPLICATION

This application claims priority under 35 USC 119 to U.S. Provisional Application No. 61/347,015, filed May 21, 2010, and entitled "Real Time Tracking/Detection of Multiple Targets on Mobile Devices" which is assigned to the assignee hereof and which is incorporated herein by reference.

BACKGROUND

A significant challenge to enabling Augmented Reality (AR) on mobile phones or other mobile platforms is the problem of estimating and tracking the camera pose in real-time. Pose tracking for AR applications has very demanding requirements: it must deliver full six degrees of freedom, give absolute measurements with respect to a given coordinate system, be very robust and run in real-time. Of interest are methods to compute pose using computer vision (CV) based approaches, which rely on first detecting and, subsequently, tracking objects within the camera view. In particular, it is essential for the tracking operations to be completed within the camera frame duration, in order for the augmentations rendered by the graphics engine to be tightly aligned with real (world) objects. Furthermore, it is important that object detection runs in parallel with tracking to identify new objects that appear within the camera view.

Recently, mobile phones have become increasingly attractive for AR. With the built-in camera as the primary sensor, phones facilitate intuitive point-and-shoot interaction with the environment. However, the limited computational capabilities of the mobile phone CPU require increased efficiencies. Moreover, the fidelity of the user interface demands that the real-time characteristics of the pose tracking should not be affected by the image content.

SUMMARY

A mobile platform detects and tracks at least one target in real-time, by tracking at least one target, and creating an occlusion mask indicating an area in a current image to detect a new target. The mobile platform searches the area of the current image indicated by the occlusion mask to detect the new target. The use of a mask to instruct the detection system where to look for new targets increases the speed of the detection task. Additionally, to achieve real-time operation, the detection and tracking is performed in the limited time budget of the (inter) frame duration. Tracking targets is given higher priority than detecting new targets. After tracking is completed, detection is performed in the remaining time budget for the frame duration. Detection for one frame, thus, may be performed over multiple frames.

In one aspect, a method of real-time pose estimation and tracking includes tracking at least one target, creating an occlusion mask indicating an area in a current image to detect a new target, and searching the area of the current image indicated by the occlusion mask to detect the new target.

In another aspect, an apparatus includes a camera; a processor connected to the camera to receive images from the camera in a live video stream; memory connected to the processor; a display controlled by the processor. Software held in the memory and run in the processor causes the processor to track at least one target, create an occlusion mask indicating an area in a current image to detect a new target; and search the area of the current image indicated by the occlusion mask to detect the new target.

In another aspect, a system for real-time pose estimation and tracking includes a means for tracking at least one target; means for creating an occlusion mask indicating an area in a current image to detect a new target; and means for searching the area of the current image indicated by the occlusion mask to detect the new target.

In yet another aspect, computer-readable medium including program code stored thereon includes program code to track at least one target; program code to create an occlusion mask indicating an area in a current image to detect a new target; and program code to search the area of the current image indicated by the occlusion mask to detect the new target.

In a different aspect a method of real-time pose estimation and tracking includes tracking a plurality of targets in each frame in a live video stream by matching a number of features in each frame to features from a plurality of reference images, wherein tracking the target in each frame comprises varying the number of features to be matched to complete the tracking in each frame; and detecting a new target in one frame from the live video stream during a plurality of frames in the live video stream.

In another aspect, an apparatus includes a camera; a processor connected to the camera to receive frames from the camera in a live video stream; memory connected to the processor; and a display controlled by the processor. The apparatus further includes software held in the memory and run in the processor to cause the processor to track a plurality of targets in each frame in the live video stream by matching a number of features in each frame to features from a plurality of reference images, wherein the processor varies the number of features to be matched to complete the tracking in each frame, and to detect a new target in one frame from the live video stream during a plurality of frames in the live video stream.

In another aspect a system of real-time pose estimation and tracking includes means for tracking a plurality of targets in each frame in a live video stream by matching a number of features in each frame to features from a plurality of reference images, wherein the number of features to be matched is varied to complete the tracking in each frame; and means for detecting a new target in one frame from the live video stream during a plurality of frames in the live video stream.

In yet another aspect, a computer-readable medium including program code stored thereon, includes program code to track a plurality of targets in each frame in the live video stream by matching a number of features in each frame to features from a plurality of reference images, wherein the number of features to be matched is varied to complete the tracking in each frame; and program code to detect a new target in one frame from the live video stream during a plurality of frames in the live video stream.

DETAILED DESCRIPTION

Figures 1A, 1B:
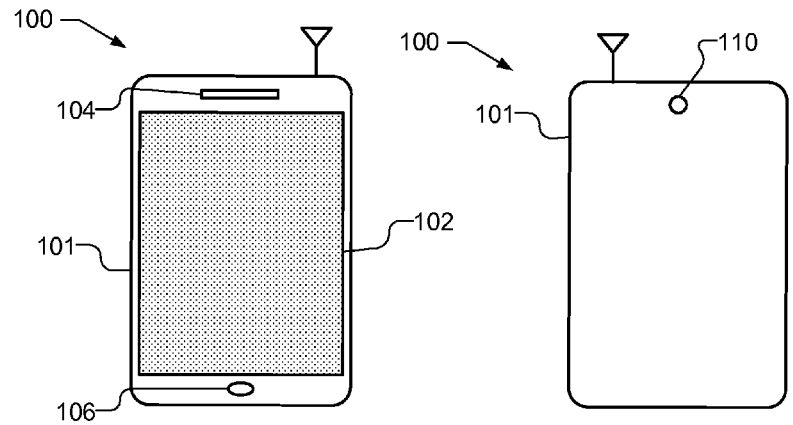
FIGS. 1A and 1B illustrate a front side and back side, respectively, of a mobile platform capable of real-time tracking of at least one target.

FIGS. 1A and 1B illustrate a front side and back side, respectively, of a mobile platform 100, capable of real-time tracking of at least one target. The mobile platform 100 is illustrated as including a housing 101, a display 102, which may be a touch screen display, as well as a speaker 104 and microphone 106. The mobile platform 100 further includes a camera 110 to image the environment.

As used herein, a mobile platform refers to any portable electronic device such as a cellular or other wireless communication device, personal communication system (PCS) device, personal navigation device (PND), Personal Information Manager (PIM), Personal Digital Assistant (PDA), or other suitable mobile device. The mobile platform may be capable of receiving wireless communication and/or navigation signals, such as navigation positioning signals. The term "mobile platform" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile platform" is intended to include all electronic devices, including wireless communication devices, computers, laptops, tablet computers, etc. which are capable of AR.

The mobile platform 100 detecting and tracking at least one target in real-time, using a mask that is created by the tracking system to instruct the detection system where to look at for new targets, thereby speeding up the detection task. In order to achieve real-time operation, the detection and tracking must be performed in the limited time budget of the (inter) frame duration, which must also include image acquisition, rendering, and system overhead components. In the available time, higher priority is given to tracking targets that have already been detected. After tracking is completed, detection is performed on the image, or the portion of the image that was not processed by the tracker since it is more likely that new objects will be detected in these areas. The detection process is run only in the time budget left over after tracking is completed, and, hence, may need to be distributed over multiple frames. Thus, the detection and tracking pipelines are separate, and optimized for their respective tasks. More formally, the scheduling of the tracking and detection tasks may be formulated as a constrained optimization problem, accounting for both the benefits & costs of tracking/detecting at least one target.

Scheduling tracking and detection tasks using a constrained optimization framework, permits tradeoffs between tracking quality, number of objects tracked, and (new) object detections while meeting the real-time processing constraint. This approach ensures that the most important task of tracking already detected objects is addressed first, at a desirable quality level, while, at the same time, opportunistically detecting new objects within the available time budget. Additionally, using a mask that is provided by the tracking system enables early detection of new objects entering the camera view.

Figure 2:
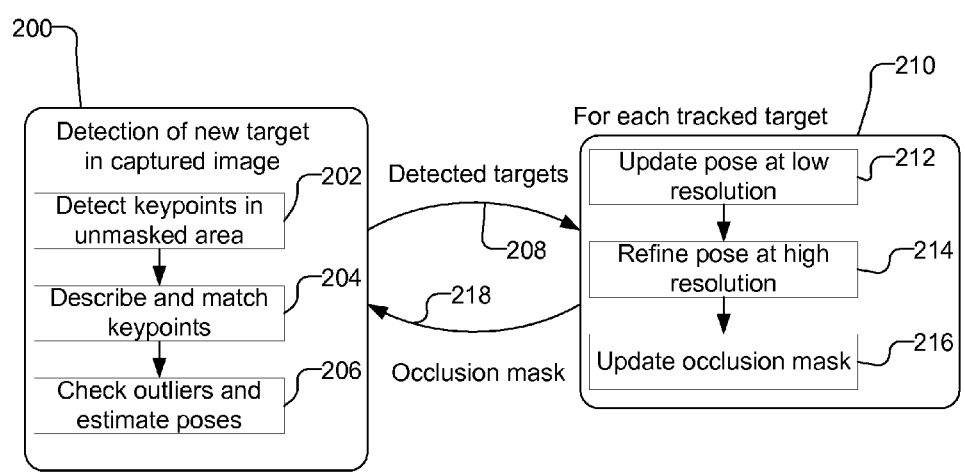
FIG. 2 is a flow chart of detection and tracking used by the mobile platform.

FIG. 2 is a flow chart of detection and tracking used by mobile platform 100. As illustrated, there are two distinct parts, detection 200 and tracking 210, which exhibit different timing characteristics. The tracking process 210 is used to track the pose of targets, i.e., the position and orientation of the targets with respect to the camera 110, that have previously been detected by the detection process 200. The tracking process 210 creates a mask that is used in the detection process to identify areas to search for new targets in the frame, thereby speeding up the detection task. The detection process 200 only searches unmasked image areas and uses a process such as Scale Invariant Feature Transform (SIFT), or Speeded-up Robust Features (SURF), or modifications thereof, or any other desired method, to match keypoints against a feature database. The detection process 200 checks the matches using geometrical constraints against outliers and estimates the pose of each newly detected target, which are then provided back to the tracking process 210.

The detection process 200 finds new tracking targets in a captured camera image and to estimate a pose, which is then forwarded to the tracking process 210. The tracking targets are previously learned targets from, e.g., a reference image, from which a feature dataset is created. The pose may be determined in, e.g., six-degrees-of-freedom. The detection process 200 detects keypoints in unmasked areas in the captured image (202). The keypoints are described and matched to the feature dataset for a previously learned target, e.g., in a reference image (204). Detection process 200 may be based on any desired keypoint extraction and matching process, such as SIFT or SURF, or a modification thereof, or any other gradient-based descriptor. For example, a SIFT-like or SURF-like implementation may be used, in which modifications are used to replace the slow aspects of the conventional processes with simpler variants. For example, the detection process may be similar to the process described in Wagner, D., Reitmayr, G., Mulloni, A., Drummond, T., Schmalstieg, D., Pose Tracking from Natural Features on Mobile Phones, In Proc. IEEE ISMAR2008, pp. 125-134, 2008, which is incorporated herein by reference in its entirety.

The conventional SIFT process uses Difference of Gaussians (DoG) to perform a scale-space search that not only detects features but also estimates their scale. Although faster variants such as SURF using Fast-Hessian have been proposed, all of these approaches are inherently resource intensive and therefore not suitable for real-time execution on mobile platforms, such as mobile phones. Thus, the DoG or Fast-Hessian approaches are replaced with FAST (Features from Accelerated Segment Test) corner detector with non-maximum suppression, which is known to be one of the fastest corner detectors, but still provides a high repeatability. The FAST corner detector is known in the art.

The FAST corner detector does not estimate a scale, and thus, the scale space is quantized into discrete steps of $1/\sqrt{2}$ and the search is performed over all scales. Tests show that gradient-based descriptors are robust enough to also match features that fall between two scales. The descriptor database contains features from all scale steps over a meaningful range (e.g., 1:5). By describing the same feature multiple times over various scales, memory is traded for speed to avoid a CPU-intensive scale-space search. This approach is reasonable because of the low memory required for each such descriptor.

The most common versions of gradient-based descriptor use 4×4 sub-regions with 4 or 8 bins each, resulting in a 64-dimensional or 128-dimensional vector. In the present approach, however, computational and memory requirements are constrained by using only 3×3 sub-regions with 4 bins each, resulting in a 36-dimensional vector. Such a variant is conventionally considered to be ~10% below optimum.

Since the present approach uses fixed-scale interest points, the descriptor kernel is fixed to 15 pixels. To gain robustness, the patch is blurred with a 3×3 Gaussian kernel. Feature orientations are estimated by calculating gradient direction and magnitude for all pixels of the kernel. The gradient direction is quantized to 36 bins and the magnitude, weighted using a distance measure, is added to the respective bin. Another method sums up all vectors created by pixel pairs from opposite locations on a circle centered at the feature location, where the vectors are weighted by the difference of the grayscale value of those pixel locations. The estimated orientation is compensated for by rotating the patch using sub-pixel accuracy. For each rotated patch, gradients are estimated, weighted by distance to the patch center and to the sub-region center, and finally written into the 4 bins of their sub-region.

The descriptors for all features in the unmasked areas of the captured camera image are created and matched against the descriptors in the database. Feature matching in the conventional SIFT process uses a k-d Tree with a Best-Bin-First strategy. We have determined that in the conventional SIFT approach, some (usually 1-3) entries of the vectors vary strongly from those in the database, tremendously increasing the required tolerance for searching in the k-d Tree, making the conventional approach infeasible on mobile platforms, such a mobile phones. The higher robustness requirements arise from the simplifications made in the previous steps, most notably the coarsely quantized scale space.

Accordingly, descriptor matching is performed using a forest of spill trees. A spill tree is a variant of a k-d Tree that uses an overlapping splitting area for higher robustness against noisy data. Spill trees are known in the art. While a single spill tree turns out to be insufficient, multiple trees with randomized dimensions for pivoting allow for a highly robust voting process. When matching descriptors, only a single leaf is visited in each tree and the resulting candidates are merged. Descriptors that are found in only one tree are discarded; all others are matched using Euclidean distance. Alternatively descriptors can be matched using a K-Means tree, which uses Euclidean distance for descriptor comparison at all levels of the tree. Descriptor matching speed can be improved using SIMD (Single Instruction Multiple Data) processor extensions such as SSE or NEON.

The detection process 200 then checks and removes outliers and estimates poses for any newly detected targets (206). Outlier removal operates in two steps. First, the relative orientations of all matched features are corrected to the absolute rotation using the feature orientations stored in the database. All features should have a similar orientation, as planar targets are used by the tracking process. Entering all orientations into a histogram and searching for a peak, a main orientation is estimated in linear time and used to filter out those features that do not support this hypothesis. The remaining matches are used in a PROSAC scheme to estimate a homography between the model points of the planar target and the input image. PROSAC is known in the art. The final homography is estimated from the inlier set and used as a starting point in a 3D pose refinement scheme.

The pose extracted from the inliers is coarse and needs to be improved using non-linear refinement. A Gauss-Newton iteration is applied to minimize the reprojection error of the 3D-2D point correspondences. For increased robustness, a robust M-estimator may be used to weight the influence of all correspondences by their variance using a Tukey function.

$$e(C) = \min \sum_{i=1}^{N} w(r_i) \cdot r_i^2 \qquad \text{eq. 1}$$

$$r_i(C, x_i) = p_i - proj(C, x_i) \qquad \text{eq. 2}$$

$$w(r_i) = (1 - (r_i/c)^2)^2 \text{ if } |r_i| \le c \text{ or } 0 \text{ otherwise} \qquad \text{eq. 3}$$

$$c = (1.48261 + 5/(N-5)) \cdot \text{median}(r_i) \qquad \text{eq. 4}$$

For a set of N observations $p_i$ of model points $x_i$, the overall observation error e(C) is minimized for a camera pose C, which is a weighted sum of individual squared residuals $r_i$. The residuals are defined as the offset between the observation $p_i$ and the respective projection proj(C, $x_i$) of the model point $x_i$. Each squared residual is weighted by the Tukey function w.

The detected target, i.e., the target name and pose, is then passed to the tracking process 210, as indicated by arrow 208.

The target detection process 200 treats each search image independently. In other words, keypoints are detected, described, matched and used to estimate the camera pose for each searched image. Frame-to-frame coherence is not exploited during detection.

The tracking process 210, on the other hand, uses an active search approach. In other words, based on a pose prior and a motion model, the tracking process 210 coarsely estimates where to look for previously observed features and what locally affine feature transformation to expect. Using the active search approach is more efficient than tracking-by-detection because it makes use of the fact that both the scene and the camera pose change only slightly between frames.

The tracking process uses a reference image of a planar tracking target, stored at multiple scales, as the only data source. During initialization, which occurs before any detection or tracking step, e.g., when the dataset is loaded, keypoints are detected in the reference image using a FAST corner detector. The image is stored at multiple scales to avoid aliasing effects during large scale changes.

Starting with a pose prior (either from the detection process 200 or from a previously tracked frame), the tracking process 210 searches for known features at predicted locations in the camera image for each tracked target. The new locations of the features are estimated by projecting the keypoints of the reference image into the camera image.

After the new locations of the features have been estimated, they are searched within a predefined search region of constant size around the projected locations. Using the pose prior, the tracking process 210 creates affinely warped 8×8 pixel representations of the features from the reference image. The exact feature locations are determined using normalized cross correlation (NCC) over a predefined search area. For each good match, a quadratic fit into the NCC responses of the neighboring pixel positions is performed to achieve sub-pixel accuracy. NCC matching speed can be improved by using SIMD (Single Instruction Multiple Data) processor extensions such as SSE or NEON.

Template matching over a search window is fast, if the search window is small. However, a small search window limits the speed at which camera motion can be detected. To increase the search radius, a hierarchical approach is used. The new pose is estimated at low resolution (212) using an image scaled down, e.g., by 50%. Only few feature positions are searched at this resolution, but with a large search radius. The tracking process 210 uses the same pose refinement method as the detection process 200, using the pose prior as a starting point (rather than a pose from homography) for the iterative refinement. After a pose has been estimated for the low resolution image, the pose is further refined at high resolution (214), e.g., using the full resolution image, with a larger number of feature points, but with a smaller search radius.

Additionally, a motion model is used for each target to predict the camera's pose (translation and rotation) from the previous frame. A linear motion model may be used, calculating the difference between the poses of the previous two frames in order to predict the pose in the current frame. A linear motion model works well, as long as the camera's motion does not change drastically. With a tracker operating at 20 Hz or more, this is a valid assumption in most cases.

The detection process 200 and tracking process 210 described above work together and have complementary strengths. The detection process 200 can detect new targets in a camera image, estimates the camera's pose relative to these targets without prior knowledge on the exterior camera parameters, and initializes the tracking process 210.

The tracking process 210 works with a pose prior and therefore knows where to search. Consequently, the tracking process 210 runs much faster than the detection process 200. The combination of avoiding a keypoint detector, affinely warping patches and normalized cross correlation for matching makes the tracking process 210 robust. For example, due to using NCC, the tracking process 210 is robust to global changes in lighting, while the independent matching of many features increases the chance of obtaining good matches, even under extreme local lighting changes and reflections. The use of the affinely warped patches, the tracking process 210 can track under extreme tilts, e.g., close to 90°. The absence of a keypoint detection step also makes the tracking process 210 moderately robust to blur. Moreover, the tracking process is fast, requiring only ~1 ms on an average personal computer (PC) and ~6 ms on a fast mobile phone per target in typical application scenarios.

As discussed above, the tracking process 210 provides an occlusion mask that is used to speed up the detection process 200. The time required for detection largely depends on the camera resolution and number of keypoints detected in the camera image. More precisely, the time required depends on the number of pixels to be searched and the number of pixels that are classified as keypoints. Reducing these numbers by re-using information from the tracking process 210 is an efficient way to speed up the detection process 200.

Thus, by omitting areas to be searched that include already tracked keypoints, the speed of the detection process 200 is increased. Accordingly, the tracking process 210 generates/updates an occlusion mask (216) indicating areas in the image that include already tracked keypoints and provides the occlusion mask to the detection process 200, as indicated by arrow 218. The detection process 200 then detects keypoints only in the unmasked areas (202).

One approach to generating the occlusion mask is to project the shape of the tracking target into the camera image, which will mask out any keypoints within the area of the tracking target. However, such an approach does not work when tracking multiple targets, and targets overlap in image space. For instance, a new small target in front of a larger tracked target will not be detected, as the area of the larger target completely surrounds the area of the small target, and the detection process 200 will not search for keypoints in that area.

Figure 3A:
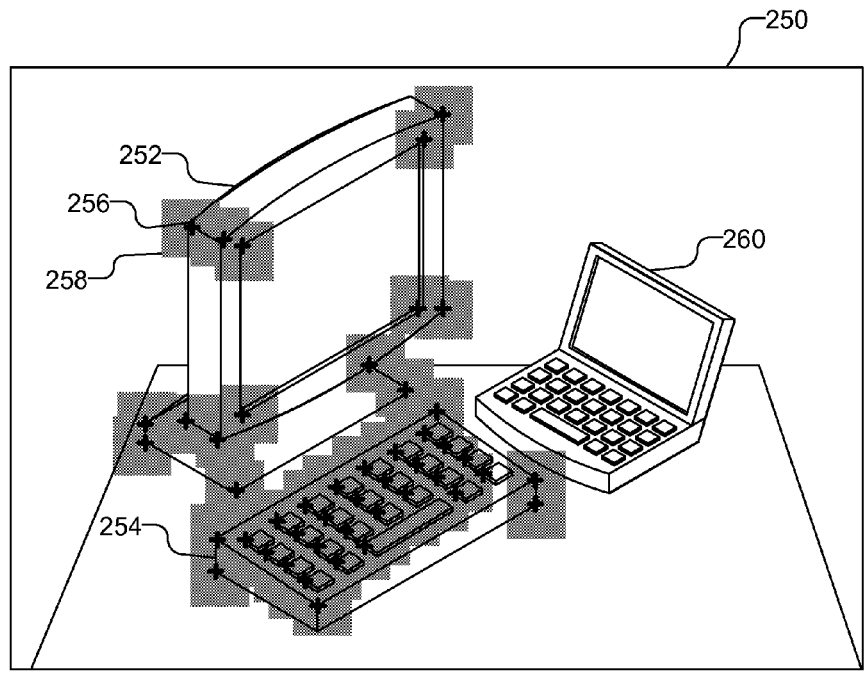
FIG. 3A illustrates an occlusion mask on an image of a tracked monitor and keyboard.
Figure 3B:
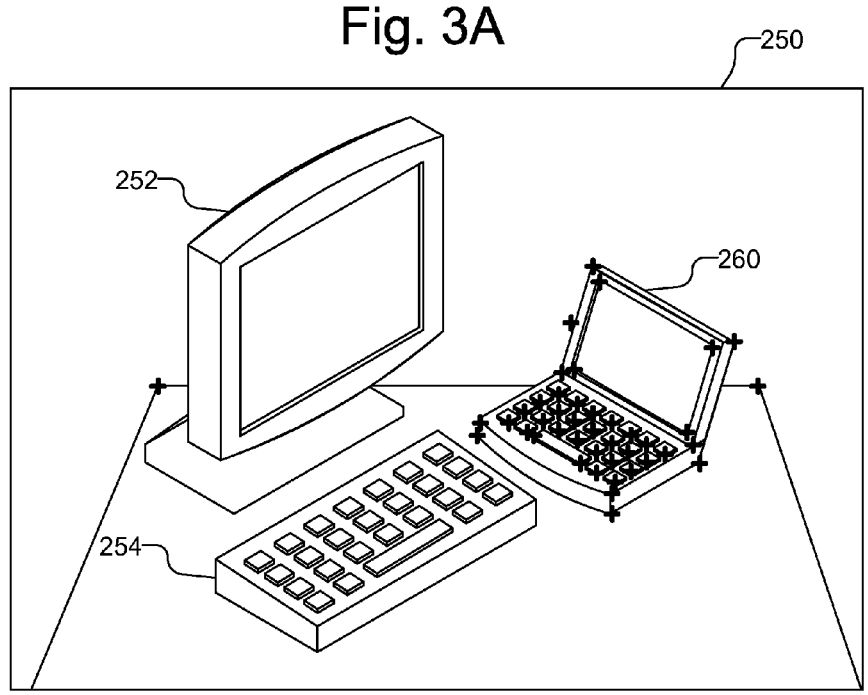
FIG. 3B illustrates the tracked monitor and keyboard during a detection process after using the occlusion mask to reduce the area of searching.

In another approach, a number of sub-masks are used to create the occlusion mask. A small sub-mask is produced around are every keypoint that is positively matched in the tracking process 210. FIG. 3A, by way of example, illustrates an image 250 of a monitor 252 and keyboard 254, which are tracked by the tracking process 210. The crosses 256 in the image 250 mark keypoints that are positively matched in the tracking process. The shaded area 258 around each cross is a sub-mask formed around the matched keypoints, which is used to form the occlusion mask. FIG. 3A also illustrates a lap-top computer 260, which is not tracked in FIG. 3A. FIG. 3B illustrates the image 250 after using the occlusion mask to reduce the area of searching during the detection process 200. As can be seen in FIG. 3B, there are no keypoints extracted for monitor 252 and keyboard 254 due to the mask produced in FIG. 3A. There are keypoints for the lap-top computer 260 however, and therefore these keypoints can be used to detect the lap-top computer 260 as a tracking target.

The size of the area of the sub-masks depends on the scale of the feature that it originates from. For example, the area of sub-masks for features at low resolution may be twice as large as the area for sub-masks for feature at high resolution. As keypoints are approximately randomly distributed over the target, the use of sub-masks to create the occlusion mask nicely covers large areas of the tracked targets. Areas not covered are usually weak in texture and therefore do not create responses during keypoint detection.

The occlusion mask may be created from the sub-masks, e.g., using an OR operation. The occlusion masks for all tracked targets are combined and forwarded to the detection process 200, which then only processes those pixels in the image that are not masked. This method can vastly reduce the number of pixels and the number of detected keypoints and therefore speed up the overall detection process 200.

The detecting and tracking of at least one target is to be performed in real-time, e.g., during the live video stream. In order to achieve real-time operation, the detection and tracking must be performed in the limited time budget of the (inter) frame duration, which must also include image acquisition, rendering, and system overhead components.

The speed of the detection process 200 is mainly dependent on the camera resolution and the number of keypoints detected. Additionally, speed is influenced by the size of the feature database and the number of outliers.

The speed of the tracking process 210 depends largely on the number of keypoints to match and the size of the search window; and therefore speed can be directly influenced. The tracking time for each target is independent of the number of targets tracked. Typically, detection for one image takes about 5-10 times longer than tracking of a single target.

In order to detect and track while obeying a fixed time budget, the time consumption of each process must be predicted. For the detection process 200, the keypoint detection (202) using FAST corners can be well predicted, since the average speed per scan line is rather stable. Keypoint description (204) using gradient-based descriptors is also stable. Descriptor matching (204) compares all descriptors against the feature database and assigns the matches to tracking targets. Again, the average time to match a descriptor can be well predicted. Outlier removal (206) takes the matches of all those targets that are not tracked yet and performs various geometrical tests (consistent keypoint rotation and spatial tests based on homography, which are well known). The time required for the outlier removal varies significantly, depending on how early a tracking target is rejected. Finally, pose refinement (206) takes the pose and the inlier set and performs the non-linear refinement, as discussed above. Since the prior pose is usually of good quality, only few iterations (typically 3) are required and the pose refinement therefore takes near constant time.

For the tracking process 210, by keeping the size of the search windows constant, the speed of the tracking process 210 directly depends on the number of keypoints to match. In the two-level approach, 25 keypoints are matched at low (half camera) resolution (212) and between 30 and 100 keypoints are matched at high (full camera) resolution (214), depending on the time budget for tracking. The time required for matching at half resolution (212) is therefore mostly constant while the time for matching at full resolution changes almost linearly with the number of keypoints to match.

Thus, the time consumption of most steps in the detection process 200 and the tracking process 210 can be well predicted with the exception of the outlier removal step (206) in the detection process 200.

Both the detecting process 200 and the tracking process 210 are performed together in order to detect and track at least one target in real-time. The tracking process 210 estimates the poses of all previously detected targets until they are lost, i.e., no longer appear in the captured images of the video stream, while the detection process 200 searches for new targets, which are then forwarded to the tracker. In order to perform detection and tracking in real-time, it is desirable to keep the overall frame time constant, e.g., 50 ms for a system running at 20 Hz. Thus, both processes are performed during each frame of the live video stream. Additionally, during each frame, rendering, image acquisition and system overhead are also performed to add up to the overall frame time.

In the available time during each frame, higher priority is given to tracking targets that have already been detected. After tracking is completed, detection is performed. The detection process is run only in the time budget left over after tracking is completed, and, hence, may need to be distributed over multiple frames. Thus, the detection and tracking pipelines are separate, and optimized for their respective tasks.

Figure 4:
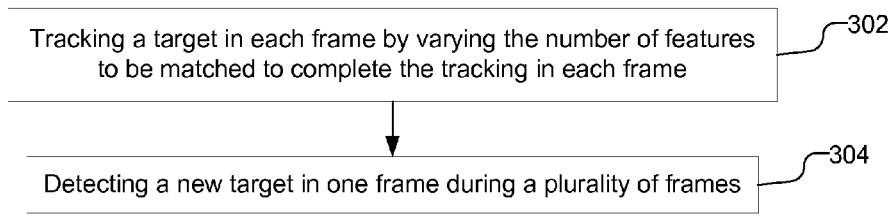
FIG. 4 is a flow chart illustrating real-time pose estimation and tracking within a limited time budget.

FIG. 4 is a flow chart illustrating real-time pose estimation and tracking within a limited time budget. A target is tracked in each frame in a live video stream by matching a number of features in each frame to features from a reference image (302). The tracking process 210 is adapted to fit into the limited time budget by varying the number of features to be matched in order to ensure that tracking is completed in each frame. In other words, the quality of the tracking process 210 is dynamically adjusted so that the one or more previously detected targets are tracked in each frame of the live video stream. The number of features to be matched may be adjusted one or more times during each frame. The process detects a new target in one frame from the live video stream during a plurality of frames in the live video stream (304). The detection process (200), thus, is performed in the remaining time budget after tracking is completed, and, thus, detection in a single image frame may be performed over multiple frames in the live video stream. Once the detection process is completed for the image frame, the detection process may be performed on the most current image frame, wherein no detection process is performed on intervening image frames.

Figure 5:
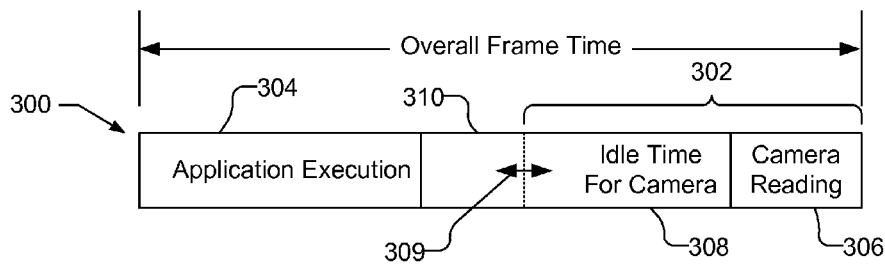
FIG. 5 illustrates the time budget for a camera frame.

The tracking process 210 therefore is adapted to fit into a time slice that is left after subtracting the application time (e.g., the game, guidance, or any other functionality being run on the mobile platform 100), and the image acquisition time from the overall frame duration. FIG. 5, by way of example, illustrates the time budget 300 for a camera frame. As illustrated, the overall frame time includes the image acquisition time 302 and the application time 304. While the application time can be accurately estimated, the image acquisition time is more problematic. Many cameras in mobile phones can only deliver the selected frame rate if the camera system process receives enough CPU time, by making the foreground task suspend to idle mode until the camera image is ready. Thus, image acquisition often includes a camera reading time 306 and a required idle time for camera 308, the duration of which is difficult to estimate, as it depends on many factors including CPU, memory and bus load. If too little idle time 308 is dedicated, the camera frame rate drops. The effect of too little idle time can be measured by the dropping frame rate, whereas too much idle time 308 is simply spent waiting for the next camera image to become available and thus, is difficult to measure. Thus, it is desirable to minimize the idle time for camera 308 to a level that does not reduce the overall camera frame time 300, thereby providing a time period 310 during which the detection process 200 and tracking process 210 may be performed. To be able to measure the effect in the change in idle time 308 in both directions, as indicated by arrow 309, a frame rate that is slightly lower than the maximum camera rate may be used. The tracking time budget is then adapted dynamically to fit this frame rate. If the overall frame rate is higher than anticipated, the tracking time may be increased, and conversely, if the frame rate is lower, the tracking time may be decreased.

Thus, once the overall tracking time budget Tv is determined, the system can adapt its operations in order to detect and track within the available time frame. For a current fast mobile phone, tracking requires about 6-8 ms per target, whereas the detection process takes about 30 ms for a full camera image. Consequently, given an overall budget of e.g. 30 ms per frame (computed as 50 ms per frame minus 20 ms for the application) detection and tracking of multiple targets cannot both be executed without optimization.

Figure 6:
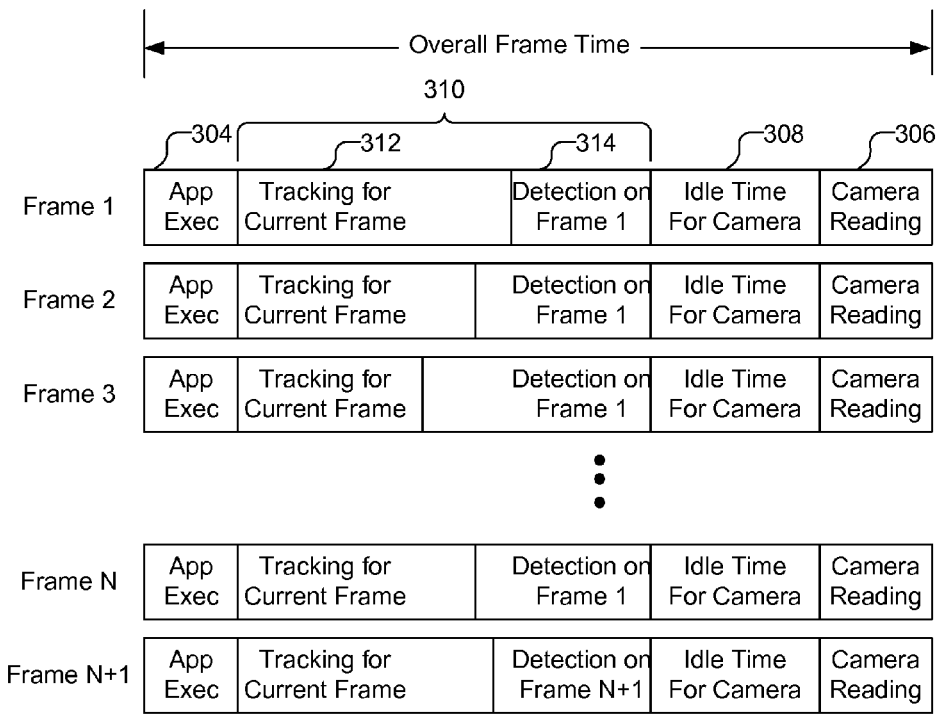
FIG. 6 illustrates the time budget for a plurality of frames in a live video stream.

FIG. 6 illustrates the time budget for a plurality of frames, labeled Frame 1-Frame N+1, in a live video stream, in which detection and tracking is optimized. As can be seen, the overall frame time for each frame includes a time period for the application execution 304, camera reading 306, and idle time for camera 308. Within the remaining time period 310, in each frame, time is provided for tracking 312 and detection 314. Tracking previously detected targets has the highest priority and is therefore run at full frame rate, i.e., the tracking task is completed for each frame, if possible at all. Detection of new targets has lower importance and thus may not run at full frame rate, but is run over multiple frames. Thus, as illustrated, during each frame, the time for tracking 312 is adjusted to ensure completion of the tracking task, while detection 313 on Frame 1 is performed in the remaining available time and is performed over multiple frames, e.g., Frames 1-Frame N. Once detection on Frame 1 is complete, detection of the current frame, Frame N+1, is performed. No detection of the intervening frames, i.e., Frames 2-N, is performed.

The task of scheduling the optimal detection and tracking within a certain time budget can be formulated as a constraint optimization problem. More formally, Cost and Benefit heuristics are defined for the tracking of target $t_i$ and the detection task.

$Cost(t_i, q_i, p_i)$ is the time it takes to track target $t_i$ at quality $q_i$; where $p_i$ is the pose prior. The quality in this metric is assumed to be proportional to the number of feature points from the given target selected for warping and matching in the active search. The cost of not tracking target $t_i$ is set to be very high (higher than detection), thereby ensuring that tracking has a higher priority than detection.

$Benefit(t_i, q_i, p_i)$ is an estimate for the contribution of tracking target $t_i$ at quality $q_i$; where $p_i$ is the pose prior. This benefit value is higher (better accuracy) with increased quality, but also takes into account the target's number of features and the pose change rate derived from the motion model. Small pose changes require fewer iterations in the pose computation, while large pose changes often introduce blur, which makes the matching more computationally intensive.

Cost(d) is an estimate of the time it takes to perform a certain fraction d of a detection task. This is proportional to the number of features in the area not covered by the occlusion mask derived from tracking the targets in the current frame.

Benefit(d) is an estimate of the contribution of performing a certain amount d of the detection task in this frame. This contribution depends on the number of frames still required to complete the detection, assuming the currently chosen amount of the task is kept over the next frames. For example, if n candidate feature pixels must be examined, choosing an amount of 0.3 n leads to upper(1/0.3)=4 frames, whereas choosing n/3 leads to only 3 frames estimated for completion time for the detection. Shorter completion times receive higher benefit.

Using the notations, the optimization can be stated as $$\max_{q_i,d} \sum_i \text{Benefit}(t_i, q_i, p_i) + \text{Benefit}(d) \qquad \text{eq. 5}$$

s.t.

$$\sum_i \text{Cost}(t_i, q_i, p_i) + \text{Cost}(d) \le T_v$$

This constrained optimization problem is a variant of the NP-complete Multiple Choice Knapsack Problem. This kind of Knapsack Problem allows to select ("pack") only one from a number of options for each item, in the present case the quality of the tracking and the amount of detection. As there are few items, i.e., typically less than tracking targets, a simple greedy heuristic suffices:

1. Maximize the cumulative relative value (Benefit/Cost) for all tracking targets while staying within the frame time;
2. Assign the remaining time to detection;
3. Try to increase detection time at the expense of tracking quality until the overall benefit no longer increases. This is done in discrete steps that reduce the number of frames until completion.

Unfortunately, some of the variables used in the optimization procedure cannot be estimated reliably. In particular, the later steps in the detection such as the outlier removal depend on the keypoint detection in the earlier steps. The overall outlier removal time varies strongly depending on how early a potential target is rejected, as discussed above. Accordingly, within one frame, the planning may be repeated or refined at several stages. After each step, the system will determine its used time and make sure that only as much work is scheduled as will likely fit into the remaining time, e.g., a limited number of image scan lines to search for keypoints. Likewise, any amount of detection left over after time runs out will be re-scheduled to continue at the next frame's detection slot.

The above-described detection and tracking process was tested on an Asus P565, a Windows Mobile phone with 800 MHz and a camera delivering up to 30 images per second at a resolution of 320×240 pixels. The target frame rate of the system was set to 23 frames per second. Each detected target was augmented with a simple virtual object (a cuboid) that is fast to render, and all targets were treated independently of each other. It was determined that while tracking a single target, enough time is left for detection of new targets within a single frame, which is due to a large area of the camera image being masked out by the tracking system. While tracking two targets, which requires about 20 ms, enough time was left for the detection process to finish its task in a single frame most of the time. Tracking three targets, however, heavily reduced the detection time budget. While tracking four targets, the tracking process started reducing tracking quality in order to maintain the frame rate and little time was left for detection. While tracking five targets, the tracking quality is further reduced to maintain the target frame rate. While tracking six targets, little time is left for detection despite the strongly reduced tracking quality, and the system would not be able to track another target once detected. Thus, it has been determined that up to six targets may be detected and tracked while maintaining a frame rate of 23 fps or more.

Figure 7:
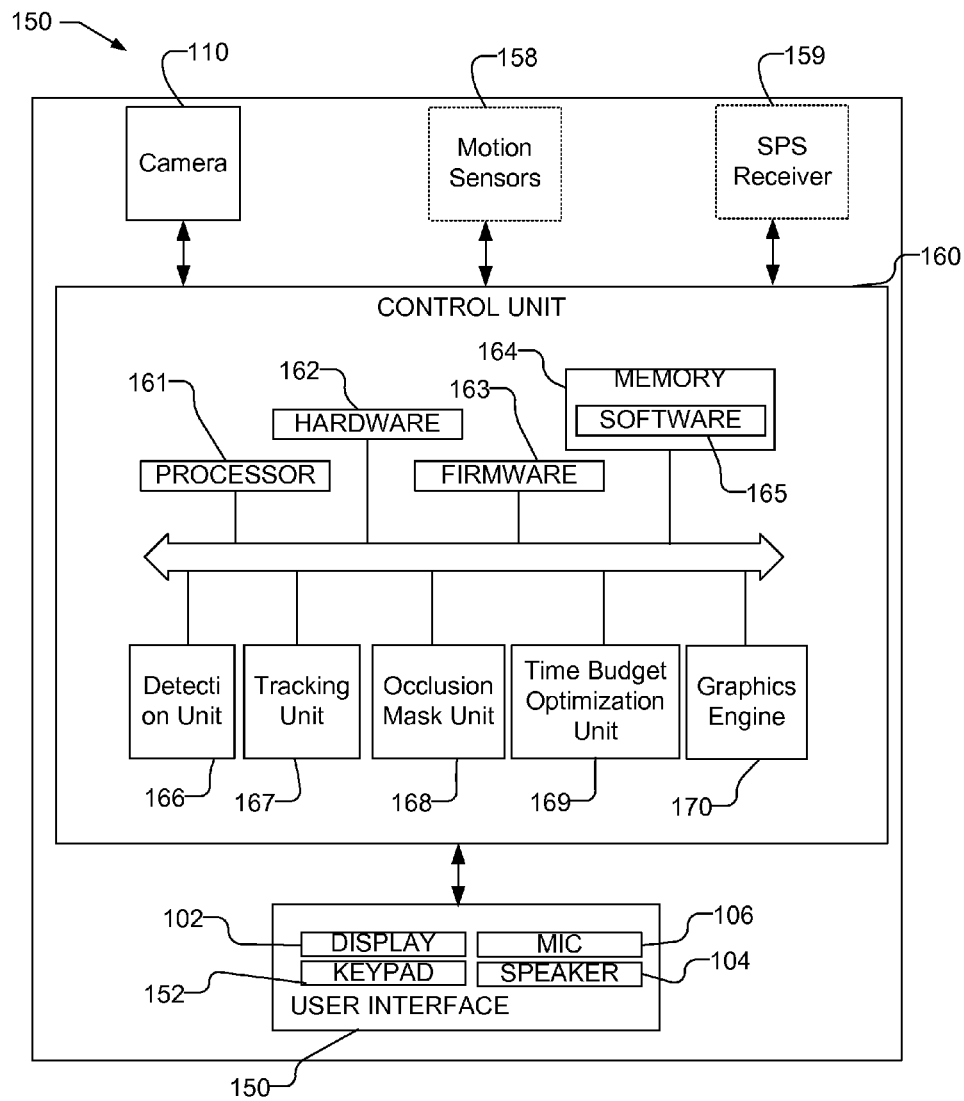
FIG. 7 is a block diagram of a mobile platform capable of real-time tracking of at least one target.

FIG. 7 is a block diagram of a mobile platform 100 capable of real-time tracking of at least one target as described above. The mobile platform 100 includes the camera 110 as well as a user interface 150 that includes the display 102 capable of displaying images captured by the camera 110. The user interface 150 may also include a keypad 152 or other input device through which the user can input information into the mobile platform 100. If desired, the keypad 152 may be obviated by integrating a virtual keypad into the display 102 with a touch sensor. The user interface 150 may also include a microphone 106 and speaker 104, e.g., if the mobile platform is a cellular telephone.

The mobile platform 100 may optionally include additional features that may be helpful for AR applications, such as a motion sensor 158 including, e.g., accelerometers, magnetometer, gyroscopes, or other similar motion sensing elements, and a satellite positioning system (SPS) receiver 159 capable of receiving positioning signals from an SPS system. Of course, mobile platform 100 may include other elements unrelated to the present disclosure, such as a wireless transceiver.

The mobile platform 100 also includes a control unit 160 that is connected to and communicates with the camera 110 and user interface 150, along with other features, such as the motion sensor 158 and SPS receiver 159 if used. The control unit 160 accepts and processes data from the camera 110 and controls the display 102 in response, as discussed above. The control unit 160 may be provided by a processor 161 and associated memory 164, hardware 162, software 165, and firmware 163. The processor 161 may be use a fixed point code path, which has been found to be faster for the above-described applications, which is assumed to be related to a suboptimal intermixing of integer and floating point code in the current generation of compilers for mobile phones. This situation is expected to improve as mobile phones increasingly support hardware floating point in the future.

The mobile platform 100 may include a detection unit 166 for performing the detection process 200 described above, and a tracking unit 167 for performing the tracking process 210 described above, and a mask unit 168 for generating an occlusion mask. The mobile platform may further include a time budget optimization unit 169 for optimizing the tracking and detection processes to operate within the time budget of the (inter) frame duration. The control unit 160 may further include a graphics engine 170, which may be, e.g., a gaming engine, to render desired data in the display 102, if desired. The detection unit 166, tracking unit 167, mask unit 168, time budget optimization unit 169 and graphics engine 170 are illustrated separately and separate from processor 161 for clarity, but may be a single unit and/or implemented in the processor 161 based on instructions in the software 165 which is run in the processor 161. It will be understood as used herein that the processor 161, as well as one or more of the detection unit 166, tracking unit 167, mask unit 168, time budget optimization unit 169 and graphics engine 170 can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile platform, and is not to be limited to any particular type of memory or number of memories, or type of media upon which memory is stored.

The methodologies described herein may be implemented by various means depending upon the application. For example, these methodologies may be implemented in hardware 162, firmware 163, software 165, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 164 and executed by the processor 161. Memory may be implemented within or external to the processor 161.

If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, Flash Memory, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method of real-time pose estimation and tracking, the method comprising:
    tracking at least one target;
    creating an occlusion mask based on the at least one tracked target; and
    searching the area of the current image indicated by the occlusion mask, which comprises pixels in the current image that are not covered by the occlusion mask, to detect a new target.

2. The method of claim 1, wherein tracking at least one target comprises matching features in the current image to features from a reference image, and wherein creating the occlusion mask based on the at least one tracked target comprises:
    generating a plurality of sub-masks, each sub-mask is generated around each feature in the current image that is matched to a feature from the reference image; and
    combining all of the plurality of sub-masks to create the occlusion mask.

3. The method of claim 1, wherein searching the area of the current image indicated by the occlusion mask to detect the new target comprises:
    detecting keypoints in the area of the current image indicated by the occlusion mask;
    describing and matching keypoints in the current image with keypoints from a reference image;
    removing outliers and estimating a pose for the new target.

4. The method of claim 3, wherein detecting keypoints in the area of the current image indicated by the occlusion mask comprises searching pixels in the current image that are not covered by the occlusion mask.

5. The method of claim 1, wherein tracking at least one target comprises:
    tracking a plurality of targets in each image in a live video stream by matching a number of features in each image to features from a plurality of reference images, wherein the number of features matched in each image is varied to complete the tracking during each frame of the live video stream; and
    wherein searching the area of the current image comprises searching the area of the current image from the live video stream over a plurality of frames from the live video stream.

6. An apparatus comprising:
    a camera;
    a processor connected to the camera configured to receive images from the camera in a live video stream;
    a display controlled by the processor; and
    memory in communication with the processor, wherein the memory is configured to store instructions configured to cause the processor to track at least one target, to create an occlusion mask based on the at least one tracked target, and search the area of the current image indicated by the occlusion mask, which comprises pixels in the current image that are not covered by the occlusion mask, to detect a new target.

7. The apparatus of claim 6, wherein the instructions configured to cause the processor to track at least one target by matching features in the current image to features from a reference image, and wherein the instructions configured to cause the processor to create the occlusion mask based on the at least one tracked target by causing the processor to:
    generate a plurality of sub-masks, each sub-mask is generated around each feature in the current image that is matched to a feature from the reference image; and
    combine all of the plurality of sub-masks to create the occlusion mask.

8. The apparatus of claim 6, wherein the instructions configured to cause the processor to search the area of the current image indicated by the occlusion mask to detect the new target by causing the processor to:

detect keypoints in the area of the current image indicated by the occlusion mask;
describe and match keypoints in the current image with keypoints from a reference image;
remove outliers and estimate a pose for the new target.

9. The apparatus of claim 8, wherein the instructions configured to cause the processor searches pixels in the current image that are not covered by the occlusion mask to detect keypoints in the area of the current image indicated by the occlusion mask.

10. The apparatus of claim 6, wherein the instructions configured to cause the processor to track a plurality of targets in each image in the live video stream by matching a number of features in each image to features from a plurality of reference images, wherein the number of features matched in each image is varied to complete the tracking during each frame of the live video stream; and
wherein the instructions configured to cause the processor to search the area of the current image from the live video stream over a plurality of frames from the live video stream.

11. A system for real-time pose estimation and tracking, the system comprising:
means for tracking at least one target;
means for creating an occlusion mask based on the at least one tracked target; and
means for searching the area of the current image indicated by the occlusion mask, which comprises pixels in the current image that are not covered by the occlusion mask, to detect a new target.

12. The system of claim 11, wherein the means for tracking at least one target matches features in the current image to features from a reference image, and the means for creating the occlusion mask based on the at least one tracked target comprises:
means for generating a plurality of sub-masks, each sub-mask is generated around each feature in the current image that is matched to a feature from the reference image; and
means for combining all of the plurality of sub-masks to create the occlusion mask.

13. The system of claim 11, wherein the means for searching the area of the current image indicated by the occlusion mask to detect the new target comprises:
means for detecting keypoints in the area of the current image indicated by the occlusion mask;
means for describing and matching keypoints in the current image with keypoints from a reference image;
means for removing outliers and estimating a pose for the new target.

14. The system of claim 11, wherein the means for tracking at least one target tracks a plurality of targets in each image in a live video stream by matching a number of features in each image to features from a plurality of reference images, wherein the number of features matched in each image is varied to complete the tracking during each frame of the live video stream; and
the means for searching the area of the current image searches the area of the current image from the live video stream over a plurality of frames from the live video stream.

15. A non-transitory computer-readable medium including program code stored thereon, comprising:
program code to track at least one target;
program code to create an occlusion mask based on the at least one tracked target; and
program code to search the area of the current image indicated by the occlusion mask, which comprises pixels in the current image that are not covered by the occlusion mask, to detect a new target.

16. The computer-readable medium of claim 15, wherein the program code to track at least one target includes program code to match features in the current image to features from a reference image, and wherein the program code to create the occlusion mask based on the at least one tracked target includes:
program code to generate a plurality of sub-masks, each sub-mask is generated around each feature in the current image that is matched to a feature from the reference image; and
program code to combine all of the plurality of sub-masks to create the occlusion mask.

17. The computer-readable medium of claim 15, wherein the program code to search the area of the current image indicated by the occlusion mask to detect the new target includes:
program code to detect keypoints in the area of the current image indicated by the occlusion mask;
program code to describe and match keypoints in the current image with keypoints from a reference image;
program code to remove outliers and estimate a pose for the new target.

18. The computer-readable medium of claim 15, wherein the program code to track at least one target includes program code to track a plurality of targets in each image in a live video stream by matching a number of features in each image to features from a plurality of reference images, wherein the number of features matched in each image is varied to complete the tracking during each frame of the live video stream; and
wherein the program code to search the area of the current image includes program code to search the area of the current image from the live video stream over a plurality of frames from the live video stream.

19. A method of real-time pose estimation and tracking, the method comprising:
determining a time budget based in part on a frame duration;
tracking at least one target in each frame in a live video stream by matching a number of features in each frame to features from a plurality of reference images, wherein the tracking the target in each frame comprises varying the number of features to be matched based on the time budget;
determining remaining time in the time budget after the tracking the at least one target; and
detecting a new target in one frame from the live video stream during a plurality of frames in the live video stream, wherein the detecting the new target is at least partially performed during the remaining time.

20. The method of claim 19, further comprising detecting a second new target in a subsequent frame from the live video stream after completing the detecting the new target in the one frame, wherein no target detection is performed on the plurality of frames between the one frame and the subsequent frame.

21. The method of claim 19, further comprising varying the number of features to be matched multiple times during each frame.

22. An apparatus comprising:
a camera;
a processor connected to the camera configured to receive frames from the camera in a live video stream;

a display controlled by the processor; and
memory in communication with the processor, wherein the memory is configured to store instructions configured to cause the processor to determine a time budget based in part on a frame duration, to track at least one target in each frame in the live video stream by matching a number of features in each frame to features from a plurality of reference images, wherein the processor varies the number of features to be matched based on the time budget, to determine a remaining time in the time budget after the tracking the at least one target; and to detect a new target in one frame from the live video stream during a plurality of frames in the live video stream, wherein the detecting the new target is at least partially performed during the remaining time.

23. The apparatus of claim 22, wherein the instructions configured to cause the processor to detect a second new target in a subsequent frame from the live video stream, wherein no target detection is performed on the plurality of frames between the one frame and the subsequent frame.

24. The apparatus of claim 22, wherein the processor varies the number of features to be matched multiple times during each frame.

25. A system of real-time pose estimation and tracking, the system comprising:
   means for determining a time budget based in part on a frame duration;
   means for tracking at least one target in each frame in a video stream by matching a number of features in each frame to features from a plurality of reference images, wherein the number of features to be matched is varied based on the time budget;
   determining remaining time in the time budget after the tracking the at least one target; and
   means for detecting a new target in one frame from the live video stream during a plurality of frames in the live video stream, wherein the detecting the new target is at least partially performed during the remaining time.

26. The system of claim 25, wherein the means for detecting further detects a second new target in a subsequent frame from the live video stream, wherein no target detection is performed on the plurality of frames between the one frame and the subsequent frame.

27. The system of claim 25, wherein the means for tracking varies the number of features to be matched multiple times during each frame.

28. A non-transitory computer-readable medium including program code stored thereon, comprising:
   program code to determine a time budget based in part on a frame duration;
   program code to track at least one target in each frame in a live video stream by matching a number of features in each frame to features from a plurality of reference images, wherein the number of features to be matched is varied based on the time budget;
   program code to determine remaining time in the time budget after the tracking the at least one target; and
   program code to detect a new target in one frame from the live video stream during a plurality of frames in the live video stream, wherein the detecting the new target is at least partially performed during the remaining time.

29. The computer-readable medium of claim 28, wherein the program code to detect a new target detects a second new target in a subsequent frame from the live video stream, wherein no target detection is performed on the plurality of frames between the one frame and the subsequent frame.

30. The computer-readable medium of claim 28, wherein the number of features to be matched is varied multiple times during each frame.

31. A method of real-time pose estimation and tracking, the method comprising:
   determining a time budget based in part on image acquisition time and frame duration;
   tracking at least one target in each frame in a video stream by matching a number of features in each frame to features from a plurality of reference images, wherein the number of features to be matched for the least one target is varied based on the time budget;
   determining remaining time in the time budget after the tracking at least one target is completed; and
   detecting a new target in one frame from the video stream during a plurality of frames in the video stream, wherein the detecting the new target is partially performed during the remaining time if the remaining time is greater than zero.

* * * * *